S. CONSTANT.
ROSIN OIL LAMP.
No. 11,474. Patented Aug. 8, 1854.
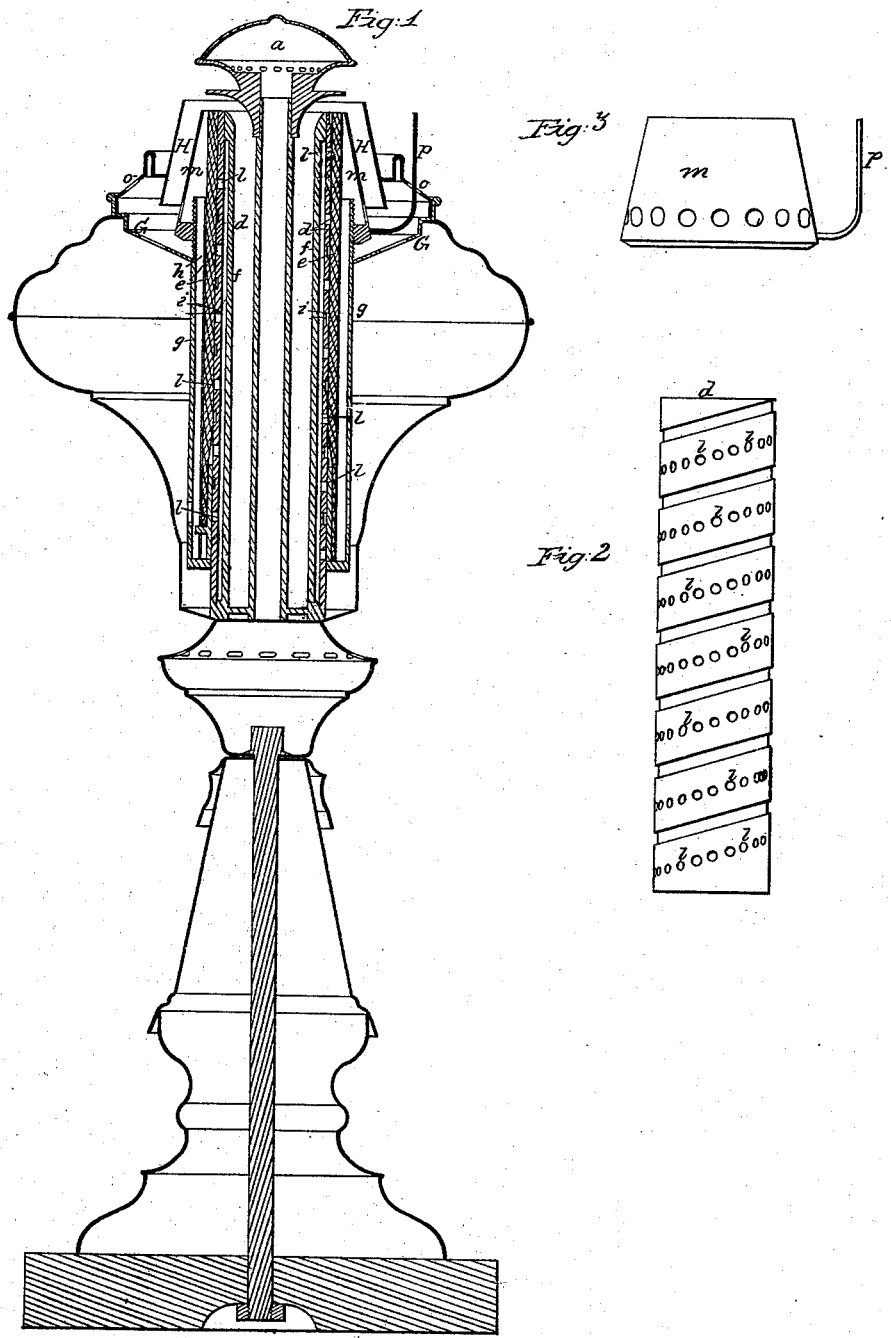

UNITED STATES PATENT OFFICE.

SILAS CONSTANT, OF BROOKLYN, NEW YORK.

IMPROVEMENT IN ROSIN-OIL LAMPS.

Specification forming part of Letters Patent No. 11,474, dated August 8, 1854.

*To all whom it may concern:*

Be it known that I, SILAS CONSTANT, of Brooklyn, in the county of Kings and State of New York, have invented certain new and useful Improvements in Rosin-Oil Lamps; and I do hereby declare that the following is a full and exact description thereof, reference being had to the accompanying drawings, making part of this specification.

Figure 1 is a vertical section through the center of a lamp comprising said improvements, and Figs. 2 and 3 views of parts detached.

Like letters designate corresponding parts in all the figures.

The general construction of the lamp is the same as that of the lamp for which Letters Patent of the United States bearing date the 24th day of January, 1854, were granted to me, with the exception of the parts wherein said improvements are made, and which are modified and arranged as hereinafter set forth.

The nature of my invention consists, first, in constructing the burner with two concentric tubes, leaving a narrow annular space between them, in which the oil ascends, and in furnishing the outer tube with a proper number of apertures through nearly its entire length, whereby to supply the oil from said annular space to the wick outside, for the double purpose of increasing the capillary action and of effectually communicating heat from the flame above to the oil thus supplied to the wick; secondly, in constructing the wick-guide without apertures through it, except near the bottom, and of sufficient size to give space for the oil to flow freely up from the bottom, inside, around the wick for the purpose of preventing the oil around the wick from mixing with that in the reservoir, whereby I am enabled to raise the oil within said guide to the desired degree of heat, and at the same time keep the oil in the reservoir at a moderate temperature without obstructing the supply to the wick; thirdly, in making the conical tube which surrounds the upper portion of the wick adjustable up and down for regulating the amount of wick exposed to the flame.

The outer tube $d$ of the burner is perforated for nearly its entire length with a series of apertures $l$ $l$, &c., which are conveniently arranged in a spiral manner, as shown in Fig. 2. The inner tube $f$ is made of such a size as to nearly fill the inside of the tube $d$, leaving only a narrow annular space $i$ between them, which space is intended for the purpose, in part, of assisting, by its capillary action the ascent of oil to the top of the wick, and should consequently be as narrow as practicable. The oil flows into it from the oil-reservoir through the lower apertures $l$ $l$, &c., of the outer tube $d$, and by the same series of apertures is again freely supplied to the wick from any part of the space. Heat is communicated from the flame at the top of the burner down both tubes, and thus raises the oil as it flows up in the space between and to the wick to a considerable degree of heat, which is a desideratum to be accomplished. The inner tube $f$ is permanently attached to the lamp, and the outer tube $d$ removable from it, for convenience in cleaning out the space $i$ if necessary.

The wick-guide $g$, instead of fitting closely around the wick in the usual manner, is made sufficiently large to leave space inside around the wick of the proper size to allow the oil to flow freely up from the bottom around the wick to supply it, but to furnish no unnecessary space, and instead of being perforated from top to bottom, as is usual, to allow the external oil to flow directly in to the wick, I make it perfectly tight, except just at the bottom, where it is provided with suitable apertures, through which the oil flows to the inside. The object of this arrangement is to enable me to keep the oil, after being admitted inside of said wick-guide, from mixing with or communicating its heat to the oil in the reservoir outside, so that it may be raised to the desired temperature, which could not be done if all the oil in the reservoir were heated with it, and at the same time that the oil in said reservoir may not be heated to an inconvenient degree, and by the enlargement of the space around the wick the oil is even more freely supplied thereto than if there were direct communication with the reservoir through all parts of the wick-guide. By means of this enlargement, also, I obtain ample room to locate the coupling-groove $h$ within the wick-guide, and so do not need to form a longitudinal slot through the side of the tube itself, as is usually done, but which I, of course, desire to avoid. I contemplate, if desirable, attaching the cap G of the wick-guide $g$ permanently to the body of the lamp, in order to avoid the open joint where said cap is supported, in which case a rack and pinion may be employed for operating the wick in any usual manner, or the wick may be simply picked up for trimming by the scissors or fingers.

The conical tube $m$, I make adjustable up and down by cutting a female screw at its lower end, which fits upon a male screw formed on a portion of the guide-tube $g$, that projects above its cap G, as shown in Fig. 1, or by any other suitable means. It may be operated by turning the wire $p$ projecting from it up through one of the holes $o\ o$, &c., of the cap H, or by turning said cap itself. The object gained by this arrangement is that, instead of adjusting the wick up and down, it is trimmed off even with the top of the burner, and said conical tube is adjusted down or up around it, so as to expose more or less of its surface to the action of the flame. Thereby the top of the wick is kept always at the same height, so that the bottom $a$, when once arranged at the proper distance above the wick, needs never to be changed from that position.

The tubes or passages which furnish the drafts to the flame should be, respectively, of such sizes that the quantities of air supplied and the forces of the currents on opposite sides of the flame may be properly proportioned or equalized.

What I claim as my invention, and desire to secure by Letters Patent, is—

1. Constructing the tubular wick-guide $g$ without any openings through it, except at or near its lower end, and making said guide of such a size as to allow a clear annular space between it and the wick for the oil to rise in around the wick, for the purpose of preventing the oil inside of the upper portion of said wick-guide from mixing with the body of oil outside of the same, by which the oil in contact with the upper portion of the wick will be raised to a considerably higher temperature than the oil in the body of the lamp, substantially as herein set forth.

2. The regulating of the flame of the lamp by raising or lowering, in any convenient manner, the inner conical tube $m$, which immediately surrounds the upper end of the wick, substantially as herein set forth.

SILAS CONSTANT.

Witnesses:
J. S. BROWN,
GEO. A. C. SMITH.